US012623456B2

(12) United States Patent
Takei

(10) Patent No.: US 12,623,456 B2
(45) Date of Patent: May 12, 2026

(54) LIQUID EJECTION HEAD AND LIQUID EJECTION APPARATUS

(71) Applicant: CANON KABUSHIKI KAISHA, Tokyo (JP)

(72) Inventor: Yasunori Takei, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/603,979

(22) Filed: Mar. 13, 2024

(65) Prior Publication Data

US 2024/0308212 A1 Sep. 19, 2024

(30) Foreign Application Priority Data

Mar. 14, 2023 (JP) ................................ 2023-039569

(51) Int. Cl.
*B41J 2/14* (2006.01)

(52) U.S. Cl.
CPC ......... *B41J 2/1404* (2013.01); *B41J 2/14145* (2013.01); *B41J 2002/14185* (2013.01); *B41J 2002/14419* (2013.01)

(58) Field of Classification Search
None
See application file for complete search history.

(56) References Cited

U.S. PATENT DOCUMENTS 7,070,262 B2 * 7/2006 Yamamoto ............ B41J 2/1404
347/100

FOREIGN PATENT DOCUMENTS

JP 2004-230811 A 8/2004

* cited by examiner

*Primary Examiner* — Bradley W Thies
(74) *Attorney, Agent, or Firm* — Venable LLP

(57) ABSTRACT

A liquid ejection head and a liquid ejection apparatus are capable of efficiently ejecting a liquid having a viscosity of 2.5 cp or above at high frequency. To this end, a relation $L \leq H-0.4D$ is satisfied, where D is the thickness of an ejection port plate, H is the distance from an electrothermal conversion element to the outermost surface of the ejection port plate, and L is the height of an air bubble.

8 Claims, 9 Drawing Sheets

LIQUID EJECTION HEAD AND LIQUID EJECTION APPARATUS

BACKGROUND OF THE INVENTION

Field of the Invention

The present invention relates to a liquid ejection head and a liquid ejection apparatus that eject a liquid.

Description of the Related Art

In recent years, there have been increasing needs for a liquid ejection head capable of ejecting a liquid with high viscosity, and what is particularly desired is to use a liquid with a viscosity of 2.5 cp or above.

Japanese Patent Laid-Open No. 2004-230811 discloses a bubble-through ejection method which sets a short distance, 2 μm to 8 μm, between an electrothermal conversion element and an opening portion of an ejection port in order to reduce resistance to the flow in a direction toward the ejection port (hereinafter also referred to as an ejection port direction), and ejects a liquid with high viscosity as a droplet by having an air bubble communicate with the atmosphere.

In the bubble-through method, typically, the short distance between the electrothermal conversion element and the surface of the ejection port makes it possible to reduce a resistance component that inhibits the flow of liquid toward the ejection port. Thus, even with a liquid with high viscosity, favorable ejection efficiency can be achieved.

However, in the method in Japanese Patent Laid-Open No. 2004-230811, the short distance between the electrothermal conversion element and the opening portion of the ejection port inevitably shortens the height of a liquid supply channel connecting to a pressure chamber. As a result, resistance to the flow in the liquid supply channel increases, and once an ejection operation is performed, it is difficult to perform a speedy refill for the next ejection operation. The higher the viscosity of the ink, the more noticeable such a phenomenon is. Specifically, ink refilling cannot be done in time even in a case where the electrothermal conversion element is driven at high frequency, and it is therefore difficult to perform favorable ejection operation at high frequency.

SUMMARY OF THE INVENTION

Thus, the present invention provides a liquid ejection head and a liquid ejection apparatus that can efficiently eject a liquid with a viscosity of 2.5 cp or above at high frequency.

To this end, a liquid ejection head of the present invention includes an ejection port that ejects a liquid and a pressure chamber that communicates with the ejection port and is provided with a thermal energy generating element at a position facing the ejection port. The liquid ejection head ejects the liquid in a volume of 4 [pl] or above from the ejection port by generating and contracting an air bubble by application of heat from the thermal energy generating element to the liquid having a viscosity of 2.5 [cp] or above in the pressure chamber. In a direction in which the liquid is ejected from the ejection port, a relation $L \leq H - 0.4D$ is satisfied, where D is a distance from a first opening portion to a second opening portion of a member forming the ejection port, the first opening portion opening toward the pressure chamber and the second opening portion being at a side where the liquid is ejected, H is a distance from the position at which the thermal energy generating element is disposed to the second opening portion, and L is a distance from the thermal energy generating element to an air-liquid interface of the air bubble at a time when the air bubble is at a maximum volume in a liquid ejection process.

The present invention can provide a liquid ejection head and a liquid ejection apparatus that can efficiently eject a liquid with a viscosity of 2.5 cp or above at high frequency.

Further features of the present invention will become apparent from the following description of exemplary embodiments with reference to the attached drawings.

DESCRIPTION OF THE EMBODIMENTS

First Embodiment

Figure 1A:
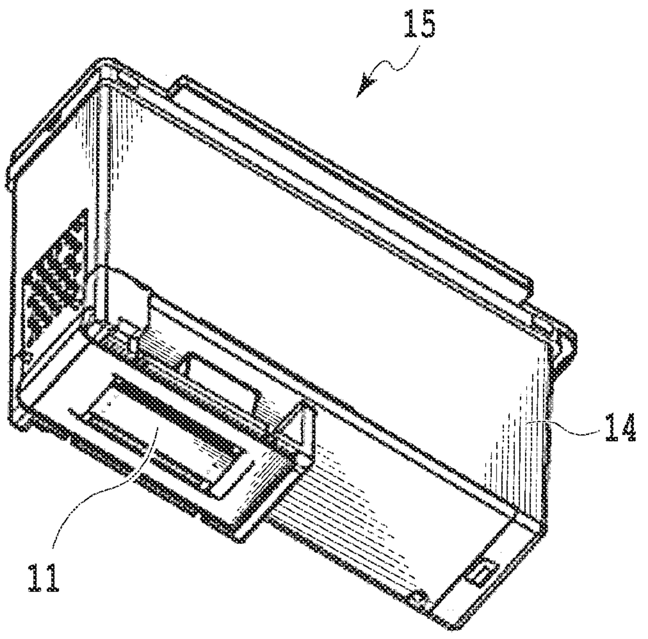
FIG. 1A is a perspective view showing a liquid ejection head.
Figure 1B:
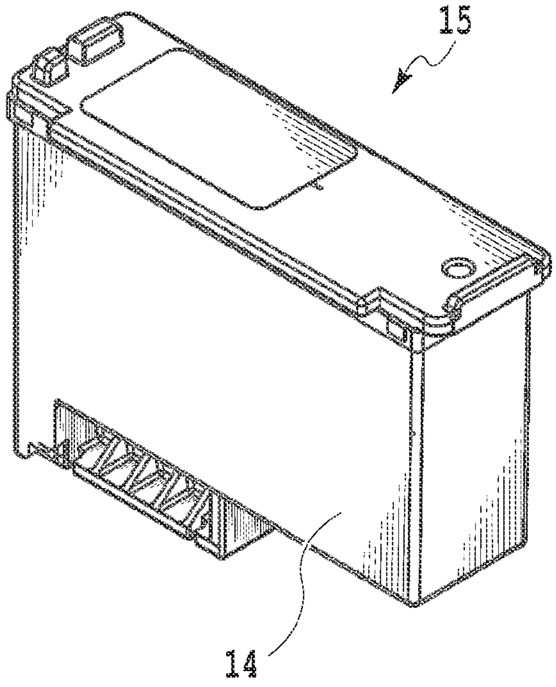
FIG. 1B is a perspective view showing the liquid ejection head.

FIGS. 1A and 1B are perspective views showing a liquid ejection head 15 of the present embodiment. FIG. 1A is an external perspective view of the liquid ejection head 15 seen from a printing element board 11 side, and FIG. 1B is an external perspective view of the liquid ejection head seen from its upper surface side. A liquid is stored in a casing 14, and this liquid is supplied to the printing element board 11 and ejected from a plurality of ejection ports provided at the printing element board 11. The liquid ejection head 15 is configured to be attachable to the liquid ejection apparatus.

Figure 2:
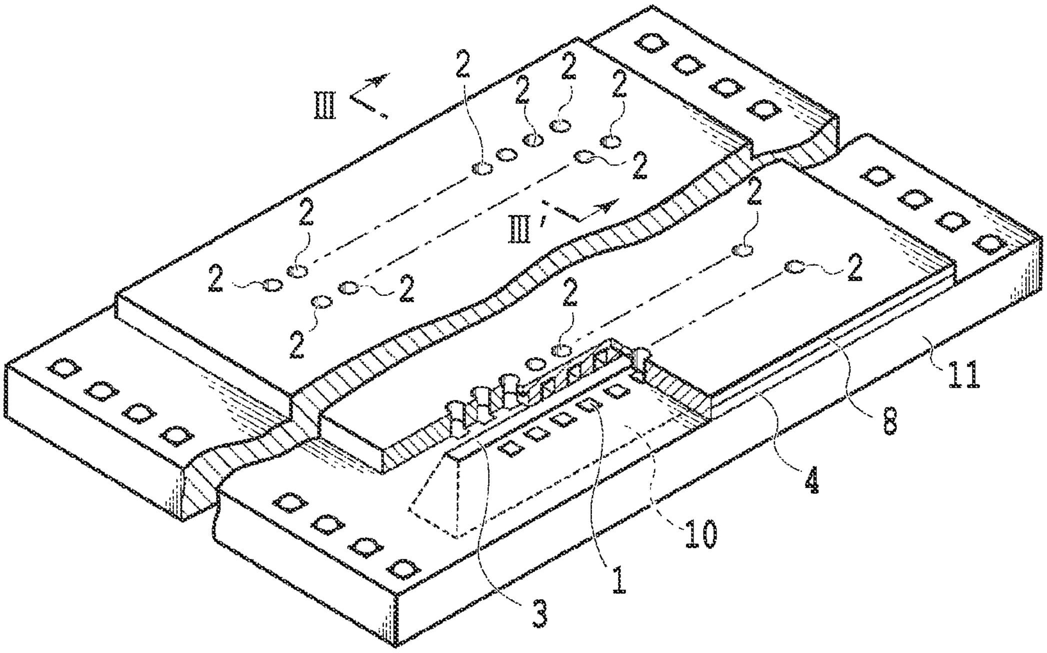
FIG. 2 is a perspective view showing a printing element board.
Figure 3:
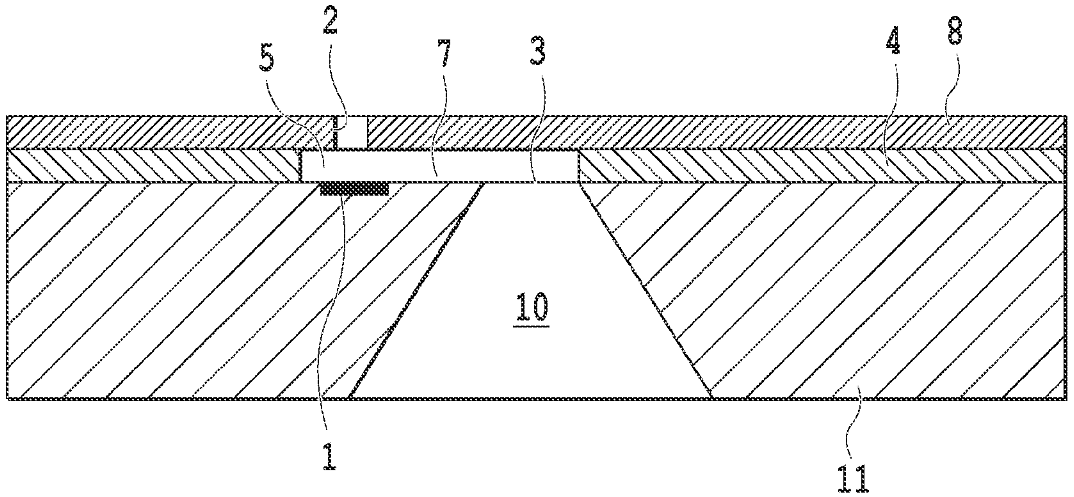
FIG. 3 is a sectional view of a section III-III' shown in FIG. 2.

FIG. 2 is a perspective view showing the printing element board 11, and FIG. 3 is a sectional view of a section III-III' shown in FIG. 2. A flow channel formation unit 4 and an ejection port plate (a member forming the ejection ports) 8 are stacked at the printing element board 11 that ejects the liquid. The flow channel formation unit 4 and the ejection port plate 8 are provided on the printing element board 11, and the liquid is supplied from a common liquid chamber 10 formed in the printing element board 11 and then from a liquid supply port 3 to each liquid flow channel 7 in the flow channel formation unit 4, and is supplied to an ejection port 2 through a pressure chamber 5. The common liquid chamber 10 can supply the liquid commonly to a plurality of pressure chambers 5. The liquid supplied to the pressure chamber 5 is given energy by an electrothermal conversion element (a thermal energy generating element) 1 and is ejected from the ejection port 2. A plurality of sets of the ejection port 2, the pressure chamber 5, and the electrothermal conversion element 1 are provided on the printing element board 11 at a predetermined interval, forming a line.

The ejection ports 2 are provided in correspondence to the respective electrothermal conversion elements 1. By the linear arrangement of the electrothermal conversion elements 1 on the printing element board 11, the ejection ports 2 can be arranged at equal distances from the liquid supply port 3, which helps prevent the ejection operation from varying over the entire liquid ejection head. Also, it is desirable that the diameter of the ejection port 2 at its ejection port surface side is the same as or smaller than that at the pressure chamber 5 side (equal to or smaller than that at the pressure chamber 5 side). Reversing this relation may inhibit efficient transmission of energy generated by the electrothermal conversion element 1 to the liquid in the ejection port.

Figure 4A:
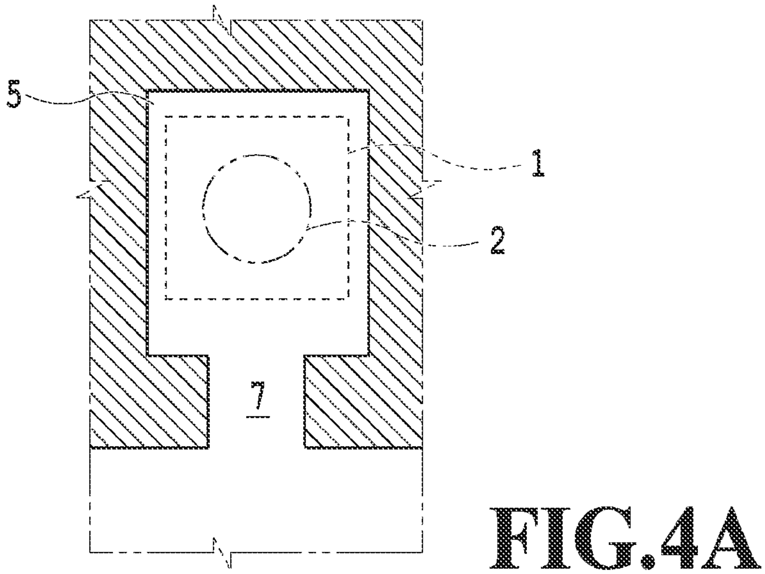
FIG. 4A is a sectional view showing an area around an ejection port at the printing element board.
Figure 4B:
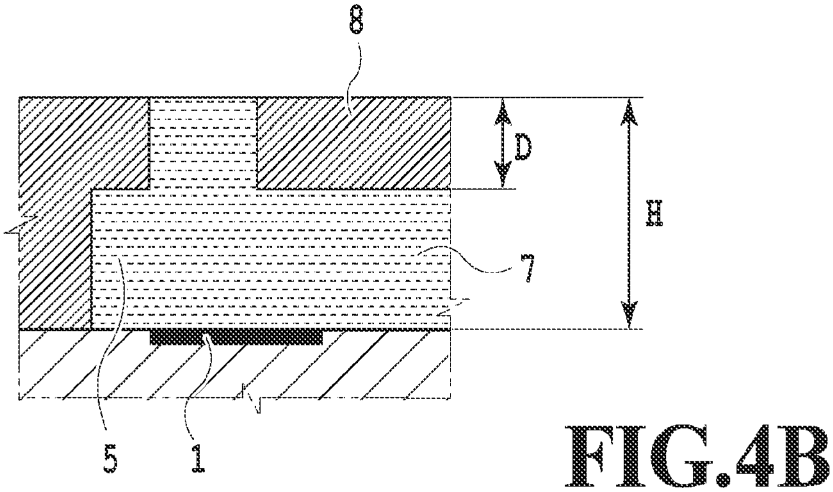
FIG. 4B is a sectional view showing an area around the ejection port at the printing element board.
Figure 4C:
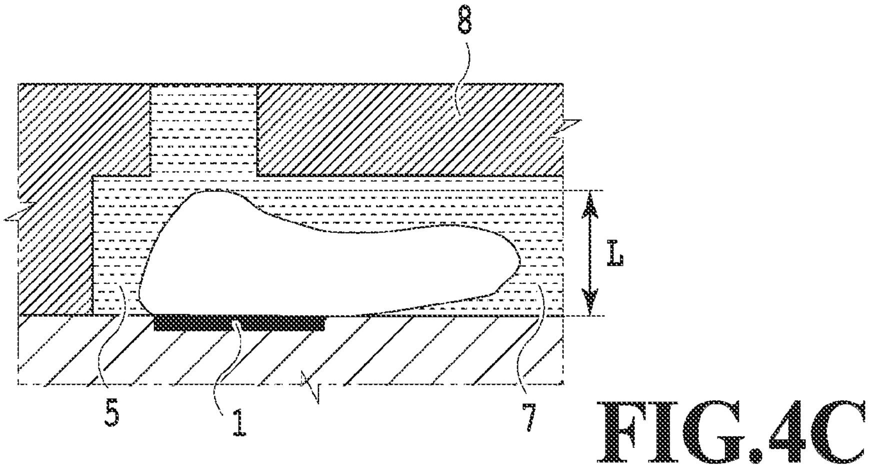
FIG. 4C is a sectional view showing an area around the ejection port at the printing element board.

FIGS. 4A to 4C are sectional views showing an area around the ejection port at the printing element board 11, FIG. 4A being a sectional view of an upper surface portion, FIGS. 4B and 4C being sectional views of a side surface portion. The liquid flow channel 7 connecting the pressure chamber 5 to the common liquid chamber 10 not only functions as a liquid flowing channel but also functions to efficiently transmit energy of an air bubble generated by the electrothermal conversion element 1 into the ejection port. This is because in a case where the liquid flow channel 7 branches or is extremely short, energy produced by an air bubble escapes to the liquid flow channel side at the time of liquid ejection, resulting in poor ejection efficiency. For this reason, it is preferable that the liquid flow channel 7 is not branched. In the present embodiment, the ejection volume is set to 5 pl, and the length of the liquid flow channel is set to 15 μm, so that the energy may not escape to the liquid flow channel side.

FIG. 4B shows the state of the inside of the ejection unit before the application of voltage to the electrothermal conversion element 1. In FIG. 4B, the distance from the pressure-chamber-side opening of the ejection port at the ejection port plate 8 to the liquid-ejecting opening thereof is denoted as a distance D, and the distance from the electrothermal conversion element 1 to the outermost surface of the ejection port plate 8 is denoted as a distance H. Then, FIG. 4C shows a state at the time when an air bubble 12 has reached its maximum volume, the air bubble 12 being produced by the electrothermal conversion element 1 being driven and applying heat to the liquid. The letter L in FIG. 4C denotes the distance from the electrothermal conversion element 1 to the air-liquid interface of the air bubble directed in the ejection direction at the time when the air bubble 12 is at its maximum.

The liquid ejection head 15 of the present embodiment employs a bubble jet method, which does not cause an air bubble in the liquid ejection head to communicate with the atmosphere during a liquid ejection process. In the bubble jet method, unlike in the bubble-through method, an air bubble produced for ejection contracts and bursts inside the liquid chamber. Then, because the liquid exists between the outside air and the bubble in this bubble bursting stage, the negative pressure produced by the bursting of the bubble makes it easy for the liquid in the flow channel to be pulled into the pressure chamber. As a result, compared to the bubble-through method which performs liquid refilling mainly by utilizing capillary force, the time it takes for the refill can be shortened, and the driving frequency can be increased as a result.

As an example, the liquid ejection head 15 of the present embodiment is driven at the maximum ejection frequency of 24 [KHz] with an ejection volume of 5 pl. Note that for liquid ejection heads with small ejection volumes such as 1 [pl] to 3 [pl], the time it takes for the refill is short accordingly; therefore, the difficulty for achieving the high frequency of 24 [KHz] as the maximum driving frequency is low.

Figure 5:
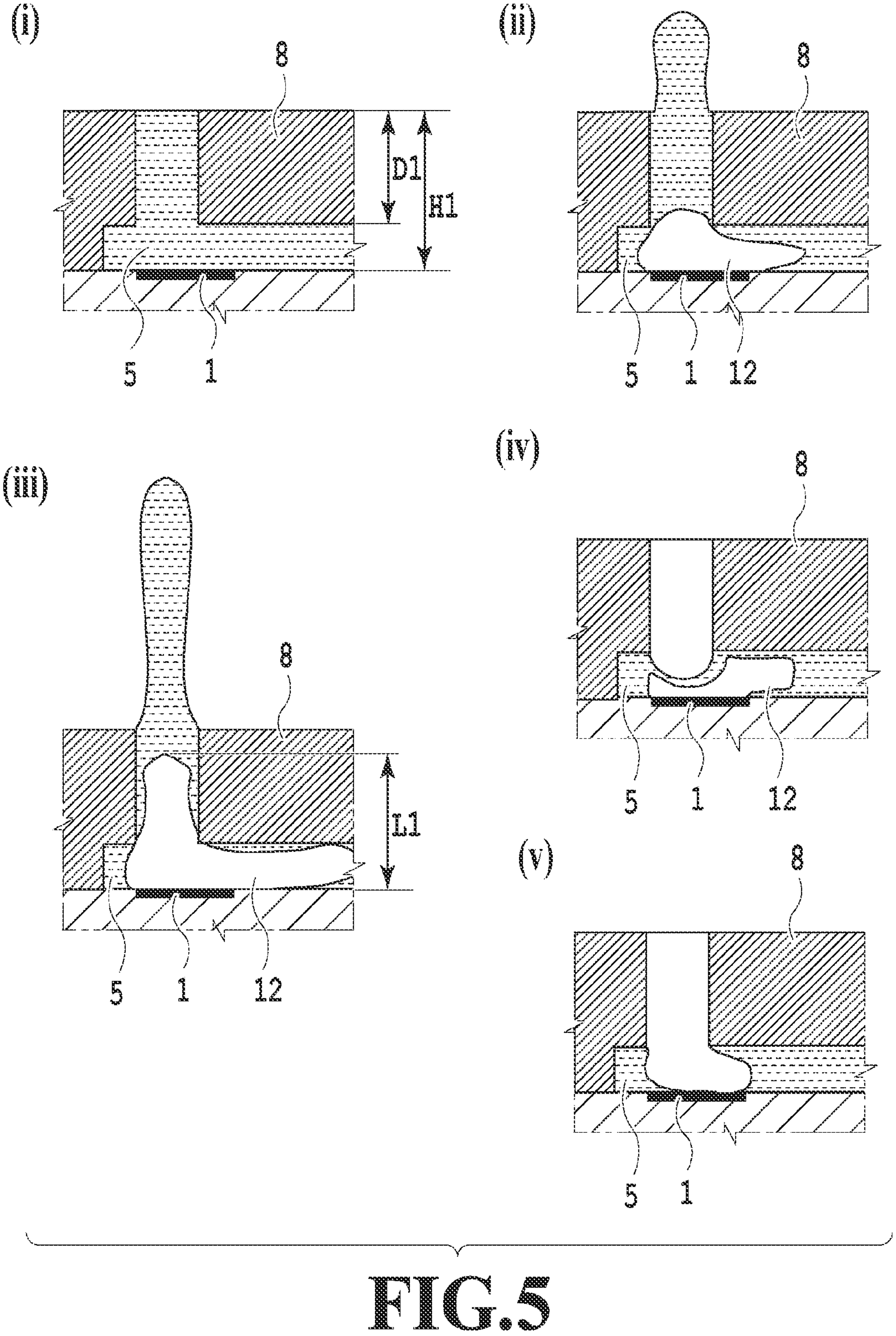
FIG. 5 is a schematic sectional view showing an ejection unit of a liquid ejection head of prior art.

FIG. 5 is schematic sectional views showing the ejection unit of a liquid ejection head of prior art employing the bubble jet method. Parts (i) to (v) of FIG. 5 chronologically show the process of ejecting a liquid droplet and, as an example, show an ejection operation performed with a section of the ejection unit being H1=40 [μm] and D1=27 [μm] and an ejection liquid amount being 5 pl.

Part (i) of FIG. 5 shows a state before the electrothermal conversion element 1 is driven. Part (ii) of FIG. 5 shows how an air bubble 12 is produced by driving of the electrothermal conversion element 1 and grows in directions toward the ejection port and the liquid flow channel. Part (iii) of FIG. 5 shows the time when the air bubble 12 has reached its maximum volume. L1 shown in FIG. 5 is the distance between the electrothermal conversion element 1 and the interface of the air bubble 12 at this time. There is a distance between the interface of the air bubble and the outermost surface of the ejection port (H1–L1 in FIG. 5) even at the time when the air bubble 12 is at its maximum, the air bubble 12 produced does not communicate with the atmosphere, including during the bubble bursting action after this.

After that, as shown in part (iv) of FIG. 5, the air bubble 12 transitions to a bubble bursting stage and contracts while pulling the liquid in from two directions: the ejection port side and the liquid flow channel side. In part (v) of FIG. 5, the bubble bursting is complete without the air bubble 12 communicating with the atmosphere. After the bubble bursting, the liquid moves in a direction toward the ejection port due mainly to capillary force and reaches the surface of the ejection port, completing the refill.

As described earlier, in a liquid ejection head using the bubble jet method, there is a long distance between the electrothermal conversion element 1 and the outermost surface of the ejection port to prevent an air bubble from communicating with the atmosphere in the ejection process. However, the long distance from the electrothermal conversion element to the outermost surface of the ejection port results in a large component of resistance to the flow of liquid along that distance. Thus, especially in a case of ejecting a liquid with high viscosity, it is difficult to give energy large enough to eject a liquid droplet.

Figure 6:
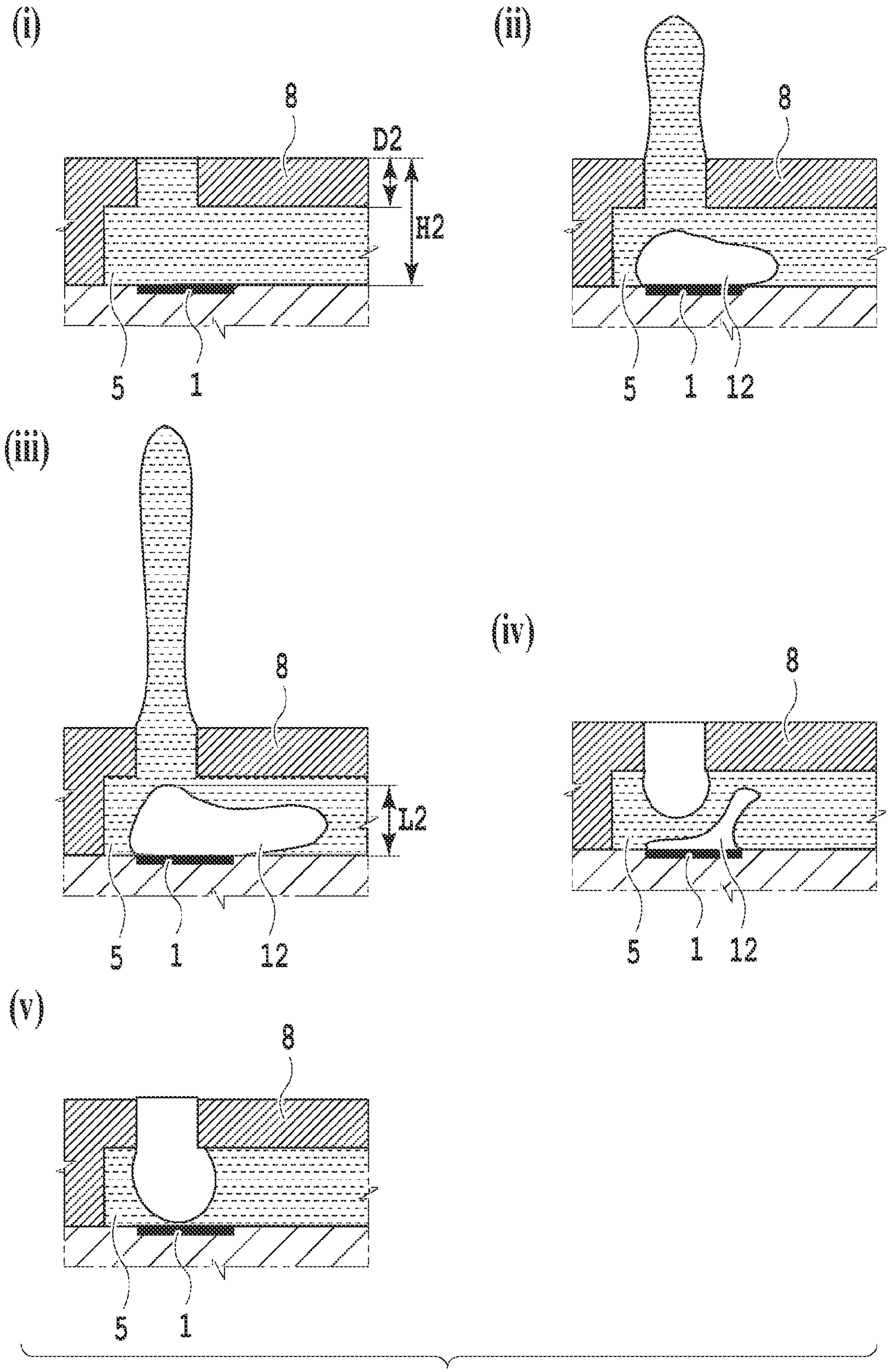
FIG. 6 is a schematic sectional view showing an ejection unit of the liquid ejection head.

FIG. 6 is schematic sectional views showing the ejection unit of the liquid ejection head 15 of the present embodiment employing the bubble jet method. Parts (i) to (v) of FIG. 6 chronologically show the process of ejecting a liquid droplet and, as an example, show an ejection operation performed with a section of the ejection unit being H2=35 [μm] and D2=15 [μm] and an ejection liquid amount being 5 [pl].

As described earlier, the ejection unit of prior art employing the bubble jet method has a structure such that there is a long distance between the electrothermal conversion element 1 and the outermost surface of the ejection port so as to have enough distance between the interface of the air bubble and the surface of the ejection port in the direction toward the ejection port at the time when the air bubble has reached the maximum volume. However, with the structure of prior art, it is difficult to eject a liquid with high viscosity for the reason described above.

Thus, the inventor of the present invention studied how to have enough distance between the interface of the air bubble and the surface of the ejection port at the time when the air bubble reaches its maximum volume by other than increasing the distance H. Then, the inventor of the present invention found that it is effective if the height of the interface of the air bubble in the direction toward the ejection port at the time when the air bubble is at its maximum volume is lower than the height thereof in prior art. Even with a short distance H from the electrothermal conversion element 1 to the surface of the ejection port, this method makes speedy refilling possible by utilizing bubble bursting while preventing the air bubble 12 from communicating with the atmosphere and therefore enables improvement in the ejection efficiency.

As a result of conducting studies earnestly, the inventor of the present invention found that in order to achieve such an ejection operation, increasing the volume of the pressure chamber 5, which is a region in which an air bubble grows and contracts, particularly in the ejection port direction (the height direction) is effective in reducing the maximum height of the air bubble. In other words, the volume of the entire pressure chamber 5 is increased in the ejection port direction to increase the proportion of the growth of the air bubble in the pressure chamber 5 in the air bubble growth stage, thereby making it less likely for the air bubble 12 to enter the ejection port. However, with the increase of the volume of the pressure chamber 5, the distance H from the electrothermal conversion element 1 to the surface of the ejection port is shortened. This shortens the distance D (the thickness of the ejection port plate 8), which makes it possible to reduce the component of resistance to the flow of liquid directed toward the ejection port. As a result, communication between the air bubble and the atmosphere can be avoided even though the distance H from the electrothermal conversion element 1 to the surface of the ejection port is short. As a result, resistance to the flow in the ejection port direction can be reduced to improve the ejection efficiency while maintaining the liquid refilling speed achieved by the bubble jet method.

In a comparison between part (i) of FIG. 6 of the present embodiment and part (i) of FIG. 5 of prior art, H2<H1, which means that the electrothermal conversion element 1 is closer in distance to the outermost surface of the ejection port. Also, D2<D1, which means that the ejection port plate 8 is thinner and the volume of the pressure chamber 5 is larger. Part (ii) of FIG. 6 shows how the air bubble 12 grows in directions toward the ejection port and the liquid flow channel. In the example of prior art shown in part (ii) of FIG. 5, in regards to the growth of the air bubble 12 in the direction toward the ejection port, the air bubble 12 starts entering the ejection port because the pressure chamber 5 is low in height, and the volume inside the ejection port is small. Thus, in part (iii) of FIG. 5 showing the subsequent stage, the air bubble 12 grows drastically in the direction toward the ejection port. By contrast, in part (iii) of FIG. 6, even at the time when the air bubble is at its maximum, the air bubble 12 does not enter the ejection port, and the distance between the interface of the generated bubble and the surface of the ejection port (H2–L2 in FIG. 6) is sufficiently long, compared to that in FIG. 5. Also, in a comparison of liquid ejection observed between parts (ii) to (iii) of FIG. 5 and parts (ii) to (iii) of FIG. 6, the liquid in FIG. 6 with better ejection efficiency is ejected faster.

After that, part (iv) of FIG. 6 shows the air bubble transitioning to the bubble bursting stage, and part (v) of FIG. 6 shows the timing of the air bubble 12 bursting. It is apparent from a comparison of the bubble bursting timing between part (v) of FIG. 5 and part (v) of FIG. 6 that the state of the liquid surface is different.

In part (v) of FIG. 5, the negative pressure generated by the bubble bursting causes the liquid surface to be strongly pulled in from the ejection port side, and consequently part of the liquid surface after the bubble bursting is in contact with the bottom surface of the ejection unit. By contrast, in the present embodiment in which the air bubble height L2 is smaller than the air bubble height L1, in part (v) of FIG. 6, the liquid surface is pulled in from the ejection port side less, and the high height of the pressure chamber allows the liquid surface to be in less contact with the bottom surface of the ejection port.

In either case of FIG. 5 and FIG. 6, after the air bubble bursts, the liquid moves mainly due to capillary force. In a case where the interface between the air and the liquid (hereinafter referred to as the air-liquid interface) is closer to the bottom surface of the ejection unit as shown in part (v) of FIG. 5, it takes a longer time for the air-liquid interface to be away from the bottom surface of the ejection unit using capillary force of the liquid flow channel 7. By contrast, as shown in part (v) of FIG. 6, in a case where the air-liquid interface is in less contact with the bottom surface of the ejection unit, it does not take time for the air-liquid interface to be away from the bottom surface of the ejection unit in the state immediately after the air bubble bursts. Thus, the air-liquid interface smoothly moves in the direction toward the ejection port, making it possible to drastically reduce the time for refilling.

As thus described, shortening the distance H from the electrothermal conversion element 1 to the surface of the ejection port reduces the resistance to the flow in the ejection port direction, and meanwhile, increasing the height of the pressure chamber 5 reduces the height L of the air bubble generated. This enables improved ejection efficiency and faster refilling at the same time.

Figure 7A:
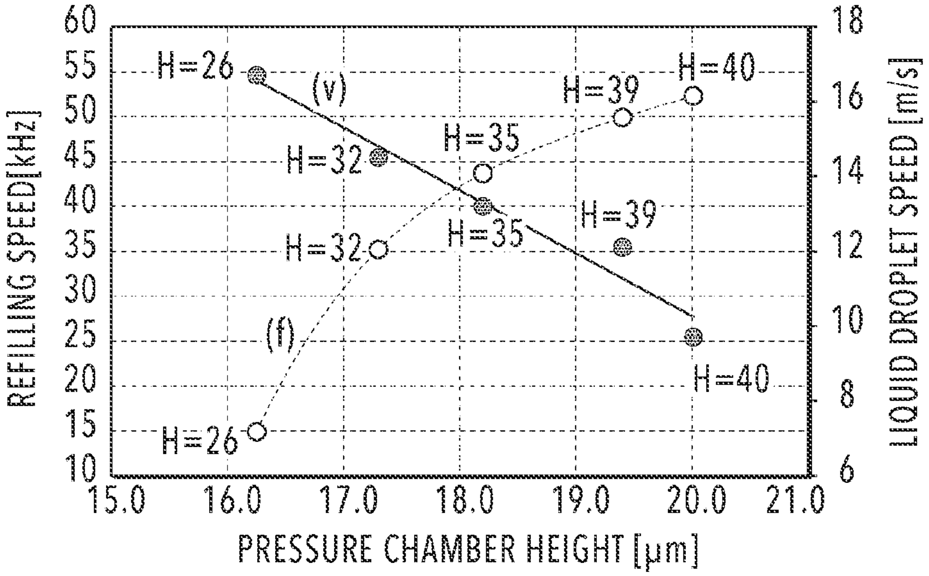
FIG. 7A is a graph showing experimental data.

FIG. 7A is a graph showing experimental data. FIG. 7A shows the relation between the refilling speed (refill frequency) and the liquid droplet speed (the ejection speed) in relation to the height dimension of the pressure chamber, in a case where the ejection liquid droplet volume is 5 [pl] and the width of the liquid flow channel 7 is 11 [μm]. In FIG. 7A, the broken line (f) represents the refilling speed (the refill frequency) in relation to the height of the pressure chamber, and the solid line (v) represents the ejection speed of a liquid droplet in relation to the height of the pressure chamber. According to the studies conducted by the inventor of the present invention, the refilling speed required to achieve an ejection frequency of 24 [KHz] is 35 [kHz] or above, and the liquid droplet speed required for a liquid droplet to land at a predetermined position on a printing medium is 10 [m/s] or above. Note that in order for an ejection operation to efficiently utilize the movement of the liquid in the liquid flow channel 7 caused by generation and contraction of an air bubble in the configuration of the present embodiment, it is preferable that the length of the liquid flow channel 7 connecting the individual pressure chambers 5 to the common liquid chamber 10 be 10 [μm] or above. In the present embodiment, the length of the liquid flow channel 7 is 19 [μm].

According to FIG. 7, the longer the distance H and the higher the height of the pressure chamber 5, the faster the refilling speed and the slower the liquid droplet speed.

Conversely, the shorter the distance H and the lower the height of the pressure chamber 5, the slower the refilling speed and the faster the liquid droplet speed.

The minimally required refilling speed of 35 [KHz] to achieve the ejection at 24 [KHz] is obtained in a case where the distance H is 32 [μm] and the height of the pressure chamber 5 is 17.3 [μm]. Further, in a case where the distance H exceeds 40 [μm], the liquid droplet speed falls below 10 [m/s], and the minimally required liquid droplet speed for a liquid droplet to land at a predetermined position on a printing medium is not reached.

The inventor of the present invention took note of the value of a formula (H–MD–L) using a coefficient M as the relation between the distance H from the electrothermal conversion element 1 to the outermost surface of the ejection port plate 8, the distance D between the pressure-chamber-side opening and the outermost-surface-side opening of the ejection port plate 8, and the maximum height L of the air bubble. Then, the inventor of the present invention studied the value of the coefficient M with which the most favorable ejection is obtainable and as a result, reached the conclusion that M=0.4 is optimal. For example, in a case where the value of M described above is M=0.3 and L≤H–0.3D, there is a region where the refilling speed of 35 [kHz] required for the driving at 24 [KHz] is not reached. Also, in a case where the value of M is M=0.5 and L≤H–0.5D, a region where the driving at 24 [KHz] is possible as the structure of the ejection unit is excluded.

Thus, the inventor of the present invention found that, in order to achieve the refilling speed of 35 [KHz] and the liquid droplet speed of 10 [m/s] required for ejection at the frequency of 24 [KHz], it is favorable that the following be satisfied:

$$L \leq H - 0.4\ D, \text{ and} \tag{I}$$

$$H < 40\ [\mu m]. \tag{II}$$

Figure 7B:
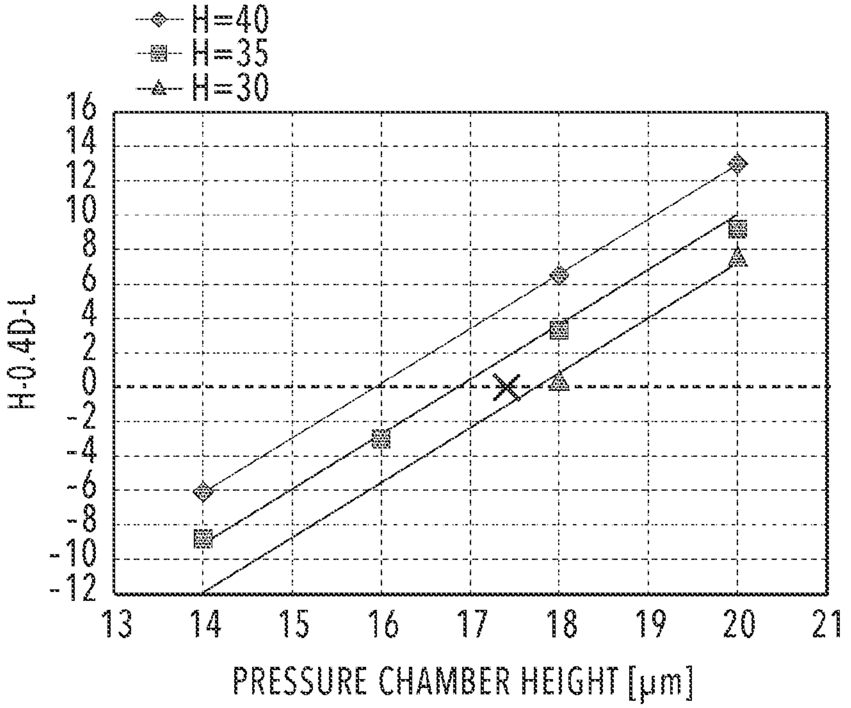
FIG. 7B is a graph showing experimental data.

FIG. 7B is a graph showing the relation between (I) and the height of the pressure chamber derived through simulation. The viscosity of liquid used for the calculation is 3.4 [cp] under the environment of 25 [C]. The height of the pressure chamber required to satisfy the conditions changes depending on the distance H for the reason below. With the height of the pressure chamber being fixed, the larger the distance H, the larger the distance D. Then, the larger the distance D, the higher the resistance to the flow at the time of ejection, which reduces the height L of the air bubble. To enable efficient ejection, it is necessary to minimize an increase in the resistance to the flow, and a region where the distance H exceeds 40 [μm] is undesirable. As mentioned earlier, the larger the resistance to the flow, the slower the liquid droplet speed, and the experiment too confirmed that the liquid droplet speed falls below 10 [m/s] in a region where the distance H is 40 [μm] or above. The plot in FIG. 7A where H=32 and the height of the pressure chamber is 17.3 is the dot denoted by (X) in the graph in FIG. 7B. In other words, the minimum refilling speed of 35 [KHz] required for the driving at 24 [KHz] is achieved in a case where the value of (H–0.4D–L) is 0.

Note that in the present invention, the viscosity of the liquid is 2.5 [cp] or above. The following is the reason for this. In a case where the present invention is applied to a liquid with low viscosity, filling speed becomes excessively fast, and as a result, the oscillation of the liquid surface due to overshoot during the liquid filling becomes large. As a result of this, the liquid may overflow onto the surface of the ejection port plate to disturb the trajectory of a liquid droplet ejected or make the ejection operation unstable during high-speed printing. Note that in the present invention, as the viscosity of the liquid, numerical values obtained by measurement under the environment of 25 [° C.] using an E-type viscometer (RE-85L manufactured by TOKISANGYO) were used.

Figure 8:
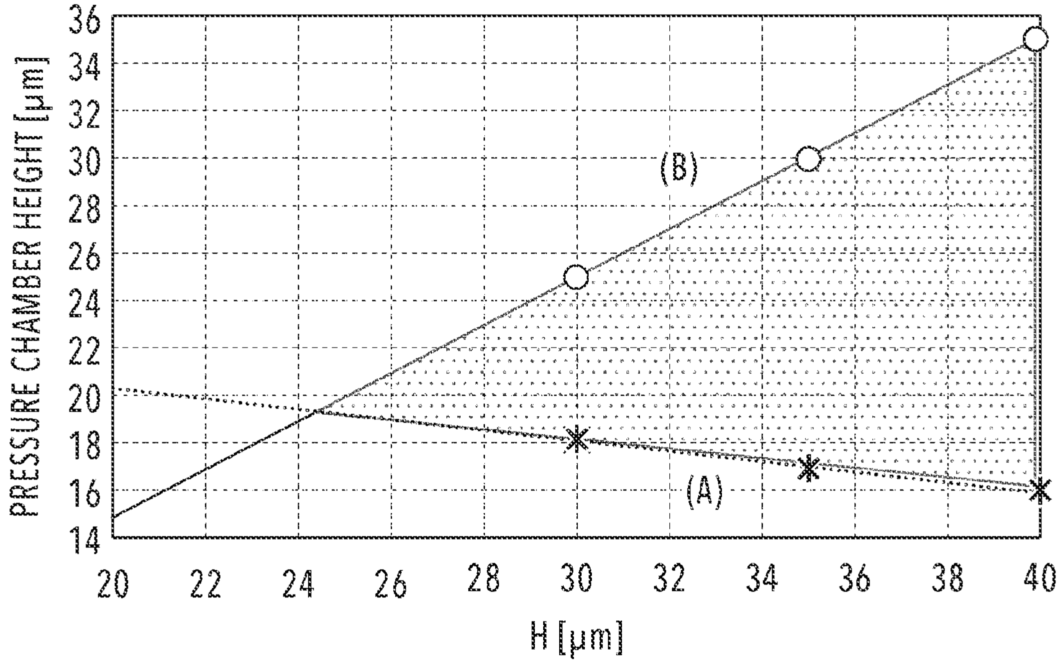
FIG. 8 is a graph showing the relation between the distance and the height of a pressure chamber.

FIG. 8 is a graph showing the relation between the distance H and the height of the pressure chamber. The following describes a specific structure of the ejection unit to achieve high-efficiency and high-speed printing using a liquid with high viscosity.

The line (A) in FIG. 8 is a line representing the relation between the distance H and the height of the pressure chamber which allows (H–0.4D–L) in FIG. 7B to be 0 (the height of the pressure chamber (H–D)=–0.22H+24.7). Also, the line (B) is a line representing the relation between the distance H and the height of the pressure chamber (H–D) in a case where the distance D=5 [μm]. The smaller the value of the distance D, which is the thickness of the ejection port plate, the weaker the strength of the ejection port plate. As to the ejection port plate, D≥5 [μm] is desirable according to the studies conducted by the inventor of the present invention.

The hatched area in the graph of FIG. 8 is a region satisfying the condition of (I) and the condition of D≥5 [μm]. The structure of the ejection unit that can be obtained by the line (A) and the line (B) satisfies the conditions shown by the following formulae:

$$H < 40[\mu m], \tag{II}$$

$$D \geq 5[\mu m], \text{ and} \tag{III}$$

$$H - D \geq -0.22H + 24.7[\mu m]. \tag{IV}$$

For example, the structure of the ejection unit of prior art shown in FIG. 5 with H=40 [μm] and D=27 [μm] satisfies (III) but does not satisfy (II) and (IV). However, with the structure of the ejection unit of the embodiment of the present invention shown in FIG. 6, H=35 [μm] and D=15 [μm], and the conditions of (II) to (IV) are satisfied.

In this way, the relation of L≤H–0.4D is satisfied where D is the thickness of the ejection port plate 8, the distance H is the distance from the electrothermal conversion element 1 to the outermost surface of the ejection port plate 8, and the height L is the height of an air bubble. This makes it possible to provide a liquid ejection head and a liquid ejection apparatus that can efficiently eject a liquid with a viscosity of 2.5 cp or above at high frequency.

Second Embodiment

A second embodiment of the present invention is described below with reference to a drawing. Note that the present embodiment has the same basic configuration as the first embodiment, and the following therefore describes only characteristic configurations.

Figure 9:
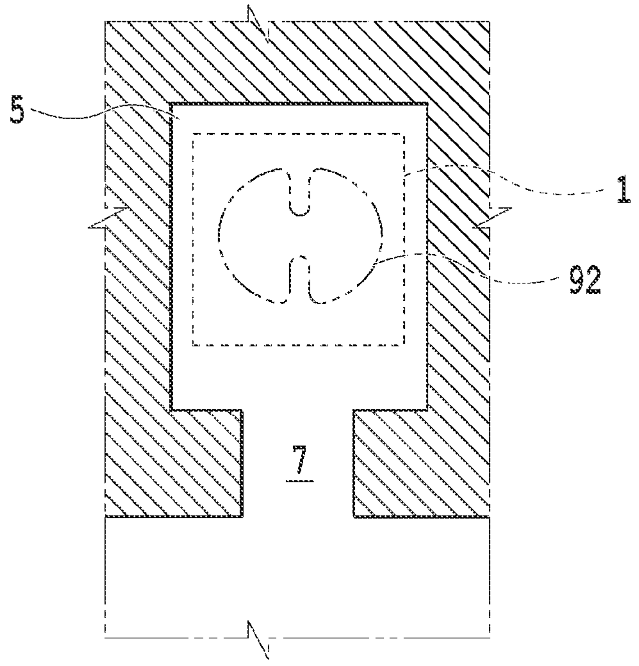
FIG. 9 is a diagram showing an area around an ejection port at a printing element board of a second embodiment.

FIG. 9 is a sectional view of an upper surface portion of an ejection port at a printing element board of the present embodiment. As shown in FIG. 9, an ejection port 92 of the present embodiment is a non-circular ejection port having two opposing protrusions. Such a non-circular ejection port may be provided in order to enable ejection that reduces satellite droplets and mist by acting on the ejection state. Even with such a non-circular ejection port, the effect of high-efficiency and high-speed filling can be achieved by the structure such that a section of the ejection unit satisfies the conditions described in the first embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-039569 filed Mar. 14, 2023, which is hereby incorporated by reference herein in its entirety.

What is claimed is:

1. A liquid ejection head comprising:

an ejection port through which a liquid is ejected; and a pressure chamber that communicates with the ejection port and is provided with a thermal energy generating element at a position facing the ejection port, the liquid ejection head being configured to eject the liquid in a volume of 4 [pl] or more from the ejection port by generating and contracting an air bubble by application of heat from the thermal energy generating element to the liquid having a viscosity of 2.5 [cp] or higher in the pressure chamber, wherein in a direction in which the liquid is ejected from the ejection port, a relation L≤H−0.4D is satisfied, where D is a distance from a first opening portion to a second opening portion of a member forming the ejection port, the first opening portion opening toward the pressure chamber and the second opening portion being at a side where the liquid is ejected, H is a distance from the position where the thermal energy generating element is disposed to the second opening portion, and L is a distance from the thermal energy generating element to an air-liquid interface of the air bubble at a time when the air bubble is at a maximum volume in a liquid ejection process.

2. The liquid ejection head according to claim 1, wherein $$H<40\ [\mu m].$$

3. The liquid ejection head according to claim 1, wherein a diameter of the second opening portion is equal to or less than a diameter of the first opening portion.

4. The liquid ejection head according to claim 1, further comprising:

a common liquid chamber capable of supplying the liquid commonly to a plurality of pressure chambers; and a plurality of liquid flow channels connecting the respective plurality of pressure chambers to the common liquid chamber, wherein the liquid flow channels are 10 [μm] or longer in length.

5. The liquid ejection head according to claim 1, wherein a plurality of sets of the ejection port, the pressure chamber, and the thermal energy generating element are provided at a predetermined interval, forming a line.

6. The liquid ejection head according to claim 1, wherein the ejection port is non-circular in shape.

7. A liquid ejection head comprising:

an ejection port through which a liquid is ejected; and a pressure chamber that communicates with the ejection port and is provided with a thermal energy generating element at a position facing the ejection port, the liquid ejection head being configured to eject the liquid in a volume of 4 [pl] or more from the ejection port by generating and contracting an air bubble by application of heat from the thermal energy generating element to the liquid having a viscosity of 2.5 [cp] or higher in the pressure chamber, wherein in a direction in which the liquid is ejected from the ejection port, relations H<40 [μm], D≥5 [μm], and H−D≥−0.22H+24.7 [μm] are satisfied, where D is a distance from a first opening portion to a second opening portion of a member forming the ejection port, the first opening portion opening toward the pressure chamber and the second opening portion being at a side where the liquid is ejected, and H is a distance from the position where the thermal energy generating element is disposed to the second opening portion.

8. A liquid ejection apparatus to which a liquid ejection head is attachable, the liquid ejection head including an ejection port through which a liquid is ejected and a pressure chamber that communicates with the ejection port and is provided with a thermal energy generating element at a position facing the ejection port, the liquid ejection head being configured to eject the liquid in a volume of 4 [pl] or more from the ejection port by generating and contracting an air bubble by application of heat from the thermal energy generating element to the liquid having a viscosity of 2.5 [cp] or higher in the pressure chamber, wherein in a direction in which the liquid is ejected from the ejection port, a relation L≤H−0.4D is satisfied, where D is a distance from a first opening portion to a second opening portion of a member forming the ejection port, the first opening portion opening toward the pressure chamber and the second opening portion being at a side where the liquid is ejected, H is a distance from the position where the thermal energy generating element is disposed to the second opening portion, and L is a distance from the thermal energy generating element to an air-liquid interface of the air bubble at a time when the air bubble is at a maximum volume in a liquid ejection process.

* * * * *